(12) United States Patent
Mukherjee et al.

(10) Patent No.: US 10,448,013 B2
(45) Date of Patent: Oct. 15, 2019

(54) MULTI-LAYER-MULTI-REFERENCE PREDICTION USING ADAPTIVE TEMPORAL FILTERING

(71) Applicant: GOOGLE INC., Mountain View, CA (US)

(72) Inventors: Debargha Mukherjee, Cupertino, CA (US); Yaowu Xu, Saratoga, CA (US); James Bankoski, Los Gatos, CA (US); Paul Wilkins, Cambridge (GB); Jingning Han, Santa Clara, CA (US); Yuxin Liu, Palo Alto, CA (US); Wei-Ting Lin, Goleta, CA (US)

(73) Assignee: GOOGLE LLC, Mountain View, CA (US)

( * ) Notice: Subject to any disclaimer, the term of this patent is extended or adjusted under 35 U.S.C. 154(b) by 57 days.

(21) Appl. No.: 15/387,690

(22) Filed: Dec. 22, 2016

(65) Prior Publication Data

US 2018/0184086 A1      Jun. 28, 2018

(51) Int. Cl.
*H04N 19/117*   (2014.01)
*H04N 19/105*   (2014.01)
*H04N 19/56*    (2014.01)
*H04N 19/134*   (2014.01)
*H04N 19/137*   (2014.01)

(52) U.S. Cl.
CPC ......... *H04N 19/117* (2014.11); *H04N 19/105* (2014.11); *H04N 19/134* (2014.11); *H04N 19/56* (2014.11); *H04N 19/137* (2014.11)

(58) Field of Classification Search
None
See application file for complete search history.

(56) References Cited

U.S. PATENT DOCUMENTS

| 5,539,663 A | 7/1996 | Agarwal |
| 7,023,923 B2 | 4/2006 | Turaga et al. |
| 8,385,404 B2 | 2/2013 | Bankoski et al. |

(Continued)

OTHER PUBLICATIONS

Zhou et al.; "An Adaptive Background-Frame Based Video Coding Method"; IEEE International Conference on Wireless Communications and Signal Processing (WCSP), Oct. 23, 2014; pp. 1-6.

(Continued)

*Primary Examiner* — Mohammad J Rahman
(74) *Attorney, Agent, or Firm* — Young Basile Hanlon & MacFarlane, P.C.

(57) ABSTRACT

Encoding or decoding blocks of video frames using multiple reference frames with adaptive temporal filtering can include generating one or more candidate reference frames by applying temporal filtering to one or more frames of a video sequence according to relationships between respective ones of the one or more frames and a current frame of the video sequence. A reference frame to use for predicting the current frame can be selected from the one or more candidate reference frames, and a prediction block can be generated using the selected reference frame. During an encoding operation, the prediction block can be used to encode a block of a current frame of the video sequence. During a decoding operation, the prediction block can be used to decode a block of a current frame of the video sequence.

20 Claims, 8 Drawing Sheets

(56) References Cited

U.S. PATENT DOCUMENTS

| | | | | |
|---|---|---|---|---|
| 8,446,964 | B2* | 5/2013 | MacInnis | H04N 19/521 375/240.29 |
| 8,532,187 | B2* | 9/2013 | Jeon | H04N 19/52 375/240.12 |
| 8,638,854 | B1* | 1/2014 | Bankoski | H04N 19/105 375/240.14 |
| 8,665,952 | B1 | 3/2014 | Grange et al. | |
| 2005/0157793 | A1* | 7/2005 | Ha | H04N 19/63 375/240.16 |
| 2005/0195900 | A1* | 9/2005 | Han | H04N 21/234327 375/240.21 |
| 2005/0286629 | A1* | 12/2005 | Dumitras | H04N 19/61 375/240.03 |
| 2006/0013310 | A1 | 1/2006 | Lee et al. | |
| 2006/0023790 | A1* | 2/2006 | Tsai | H04N 5/145 375/240.16 |
| 2006/0165301 | A1* | 7/2006 | Cha | H04N 19/105 382/240 |
| 2006/0245495 | A1* | 11/2006 | Han | H04N 19/187 375/240.13 |
| 2010/0061461 | A1* | 3/2010 | Bankoski | H04N 19/105 375/240.16 |
| 2010/0245670 | A1* | 9/2010 | Takeda | G06T 3/40 348/607 |
| 2011/0228844 | A1* | 9/2011 | Watanabe | H04N 19/503 375/240.03 |
| 2011/0286526 | A1* | 11/2011 | Nakagami | H04N 19/593 375/240.16 |
| 2012/0063513 | A1* | 3/2012 | Grange | H04N 19/61 375/240.13 |
| 2012/0257677 | A1* | 10/2012 | Bankoski | H04N 19/105 375/240.16 |
| 2017/0223350 | A1* | 8/2017 | Xu | H04N 19/105 |

OTHER PUBLICATIONS

Yaowu Xu; "Inside WebM Technology: The VP8 Alternate Reference Frame", May 27, 2010; pp. 1-2.
Jiaying Yan et al; "Introduction to AVS Introduction to AVS2 2 Scene Video Coding Techniques" Special Topic February; Feb. 1, 2016.
Zhang et al.; "Low-Complexity and High-Efficiency Background Modeling for Surveillance Video Coding"; IEEE Visual Communications and Image Processing; Nov. 27, 2012; pp. 1-6.
Wang et al.; "Overview of the Second Generation AVS Video Coding Standard"; ZTE Communications, vol. 14, No. 2; Feb. 2, 2016; pp. 3-11.
Irani et al; "Video Compression Using Mosaic Representations"; Signal Processing ; Image Communication; Elsevier Sciences Publishers; vol. 7, No. 4; Nov. 1, 1995; pp. 529-552.
International Search Report and Written Opinion dated Oct. 9, 2017 for International Application No. PCT/US2017/044649, filed Jul. 31, 2017.
Bankoski, et al., "Technical Overview of VP8, An Open Source Video Codec for the Web", Jul. 11, 2011, 6 pp.
Bankoski et al., "VP8 Data Format and Decoding Guide", Independent Submission RFC 6389, Nov. 2011, 305 pp.
Bankoski et al., "VP8 Data Format and Decoding Guide draft-bankoski-vp8-bitstream-02", Network Working Group, Internet-Draft, May 18, 2011, 288 pp.
Series H: Audiovisual and Multimedia Systems, Coding of moving video: Implementors Guide for H.264: Advanced video coding for generic audiovisual services, International Telecommunication Union, Jul. 30, 2010, 15 pp.
"Introduction to Video Coding Part 1: Transform Coding", Mozilla, Mar. 2012, 171 pp.
"Overview VP7 Data Format and Decoder", Version 1.5, On2 Technologies, Inc., Mar. 28, 2005, 65 pp.
Series H: Audiovisual and Multimedia Systems, Infrastructure of audiovisual services—Coding of moving video, Advanced video coding for generic audiovisual services, International Telecommunication Union, Version 11, Mar. 2009. 670 pp.
Series H: Audiovisual and Multimedia Systems, Infrastructure of audiovisual services—Coding of moving video, Advanced video coding for generic audiovisual services, International Telecommunication Union, Version 12, Mar. 2010, 676 pp.
Series H: Audiovisual and Multimedia Systems, Infrastructure of audiovisual services—Coding of moving video, Amendment 2: New profiles for professional applications, International Telecommunication Union, Apr. 2007, 75 pp.
Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.
Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.
Series H: Audiovisual and Multimedia Systems, Infrastructure of audiovisual services—Coding of moving video, Advanced video coding for generic audiovisual services, Version 1, International Telecommunication Union, May 2003, 282 pp.
Series H: Audiovisual and Multimedia Systems, Infrastructure of audiovisual services—Coding of moving video, Advanced video coding for generic audiovisual services, Version 3, International Telecommunication Union, Mar. 2005, 343 pp.
"VP6 Bitstream and Decoder Specification", Version 1.02, On2 Technologies, Inc., Aug. 17, 2006, 88 pp.
"VP6 Bitstream and Decoder Specification", Version 1.03, On2 Technologies, Inc., Oct. 29, 2007, 95 pp.
"VP8 Data Format and Decoding Guide, WebM Project", Google On2, Dec. 1, 2010, 103 pp.

* cited by examiner

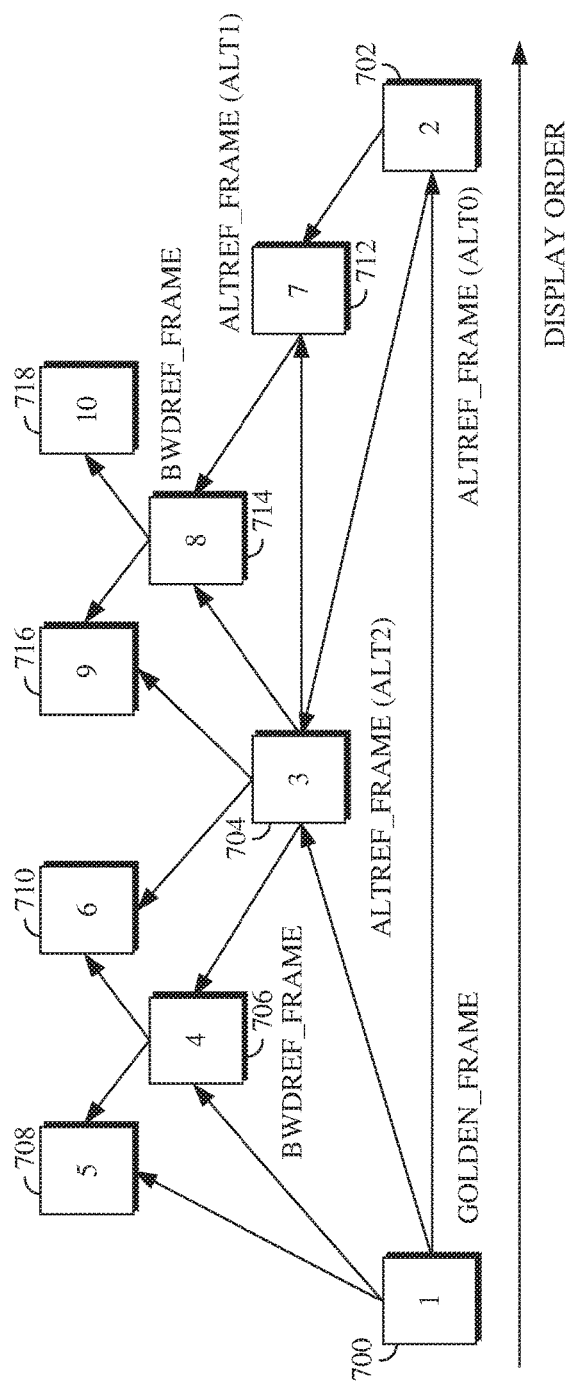
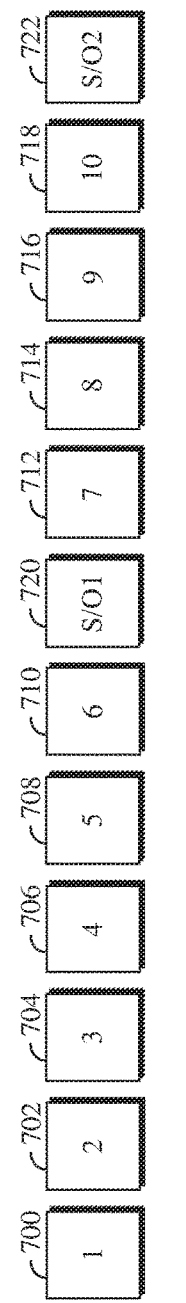
FIG. 7A
FIG. 7B

MULTI-LAYER-MULTI-REFERENCE PREDICTION USING ADAPTIVE TEMPORAL FILTERING

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission or storage of the video data. Various approaches have been proposed to reduce the amount of data in video streams, including compression and other encoding techniques.

SUMMARY

This disclosure relates generally to encoding and decoding video data and more particularly relates to multi-layer-multi-reference prediction using adaptive temporal filtering for encoding and decoding blocks of video frames.

A method for encoding frames of a video sequence according to one implementation of the disclosure comprises generating one or more candidate reference frames by applying temporal filtering to one or more frames of the video sequence according to relationships between respective ones of the one or more frames and a current frame of the video sequence. The method further comprises selecting a reference frame to use for predicting the current frame from the one or more candidate reference frames. The method further comprises generating a prediction block using the reference frame. A block of the current frame is encodable using the prediction block.

A method for decoding frames of a video sequence from an encoded bitstream according to one implementation of the disclosure comprises generating one or more candidate reference frames by applying temporal filtering to one or more frames of the video sequence according to relationships between respective ones of the one or more frames and a current frame of the video sequence. The method further comprises selecting a reference frame to use for predicting the current frame from the one or more candidate reference frames. The method further comprises generating a prediction block using the reference frame. A block of the current frame is decodable using the prediction block.

An apparatus for decoding frames of a video sequence from an encoded bitstream according to one implementation of the disclosure comprises a memory and a processor. The memory includes instructions executable by the processor to generate one or more candidate reference frames based on an application of temporal filtering to one or more frames of the video sequence according to relationships between respective ones of the one or more frames and a current frame of the video sequence. The memory further includes instructions executable by the processor to select a reference frame to use to predict the current frame from the one or more candidate reference frames. The memory further includes instructions executable by the processor to generate a prediction block using the reference frame, wherein a block of the current frame is decodable using the prediction block.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings described below wherein like reference numerals refer to like parts throughout the several views.

FIG. 7A is a diagram showing examples of layers of frames of a video sequence according to a display order of the video sequence.

FIG. 7B is a diagram showing an example encoding or decoding order of the frames shown in FIG. 7A according to the layers of FIG. 7A.

DETAILED DESCRIPTION

Figure 1:
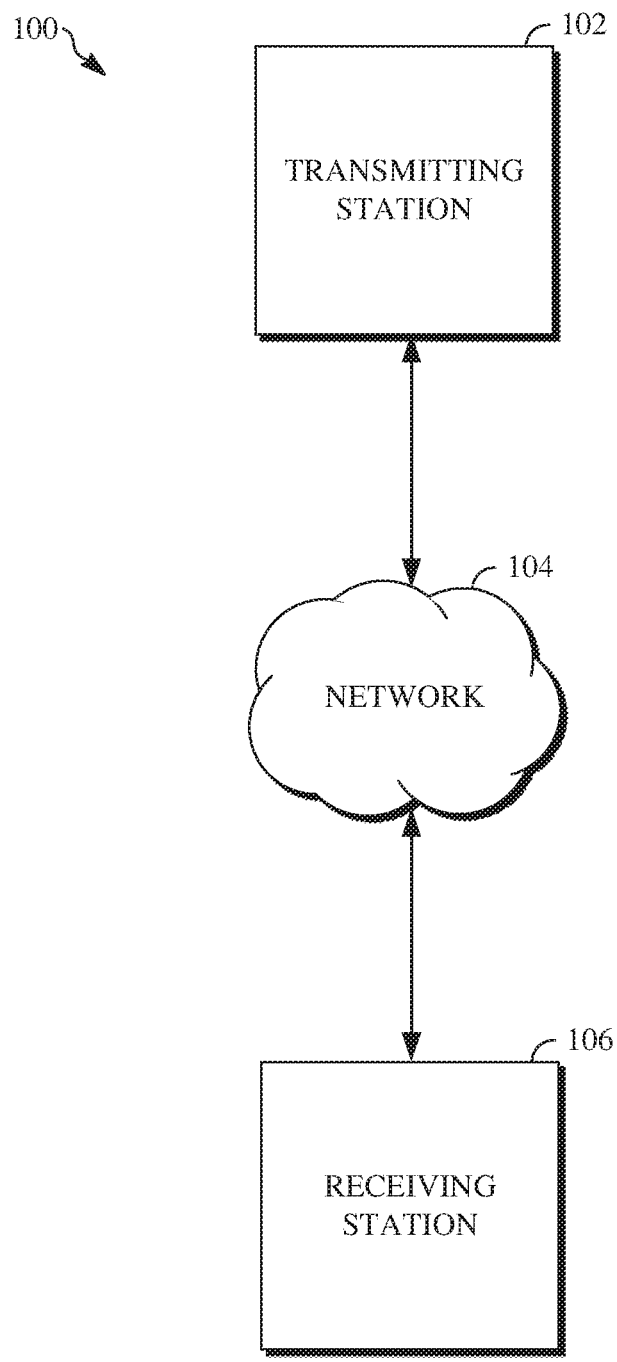
FIG. 1 is a schematic of a video encoding and decoding system.

A video stream can be compressed by a variety of techniques to reduce bandwidth required transmit or store the video stream. A video stream can be encoded into a bitstream, which can involve compression, and then transmitted to a decoder that can decode or decompress the video stream to prepare it for viewing or further processing. Compression of the video stream often exploits spatial and temporal correlation of video signals through spatial and/or motion compensated prediction. Inter-prediction, for example, uses one or more motion vectors to generate a block (also called a prediction block) that resembles a current block to be encoded using previously encoded and decoded pixels. By encoding the motion vector(s), and the difference between the two blocks, a decoder receiving the encoded signal can re-create the current block.

Each motion vector used to generate a prediction block refers to a frame other than a current frame, i.e., a reference frame. Reference frames can be located before or after the current frame in the sequence of the video stream. In some cases, there may be three reference frames used to encode or decode blocks of other frames of the video sequence. One is an intra-predicted frame referred to as a key frame. Another is a most recently encoded or decoded frame. The last is an alternative reference frame that is encoded or decoded before most other frames, but which is displayed after most frames in an output bitstream. The efficacy of a reference frame when used to encode or decode a block can be measured based on the resulting signal-to-noise ratio. However, because the alternative reference frame may be the only reference frame usable for backwards prediction, it may not result in an optimal signal-to-noise ratio.

Implementations of this disclosure include generating candidate reference frames by applying temporal filtering to one or more frames of a video sequence and selecting one of the candidate reference frames to encode or decode a block of a current frame of the video sequence. The candidate reference frames generated using temporal filtering are additional alternative reference frames usable for backwards prediction. One of the candidate reference frames can be selected for predicting blocks of frames of the video sequence during an encoding or decoding process. The candidate reference frame can be selected based on a signal-to-noise ratio analysis or other rate-distortion analysis performed with respect to respective ones of the candidate reference frames.

The strength of the temporal filtering applied to a given frame of the video sequence is determined based on a distance between the given frame and a current frame of the video sequence to be encoded or decoded. to a number of other frames of the video sequence for which that given frame could be a reference frame. As such, increasing the number of candidate reference frames using temporal filtering increases the likelihood of using an optimal reference frame for the encoding or decoding. Further details of using temporal filtering to generate candidate reference frames and using a candidate reference frame to generate a prediction block are described herein with initial reference to a system in which it can be implemented.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network or any other means of transferring the video stream from the transmitting station 102 to, in this example, the receiving station 106.

Figure 2:
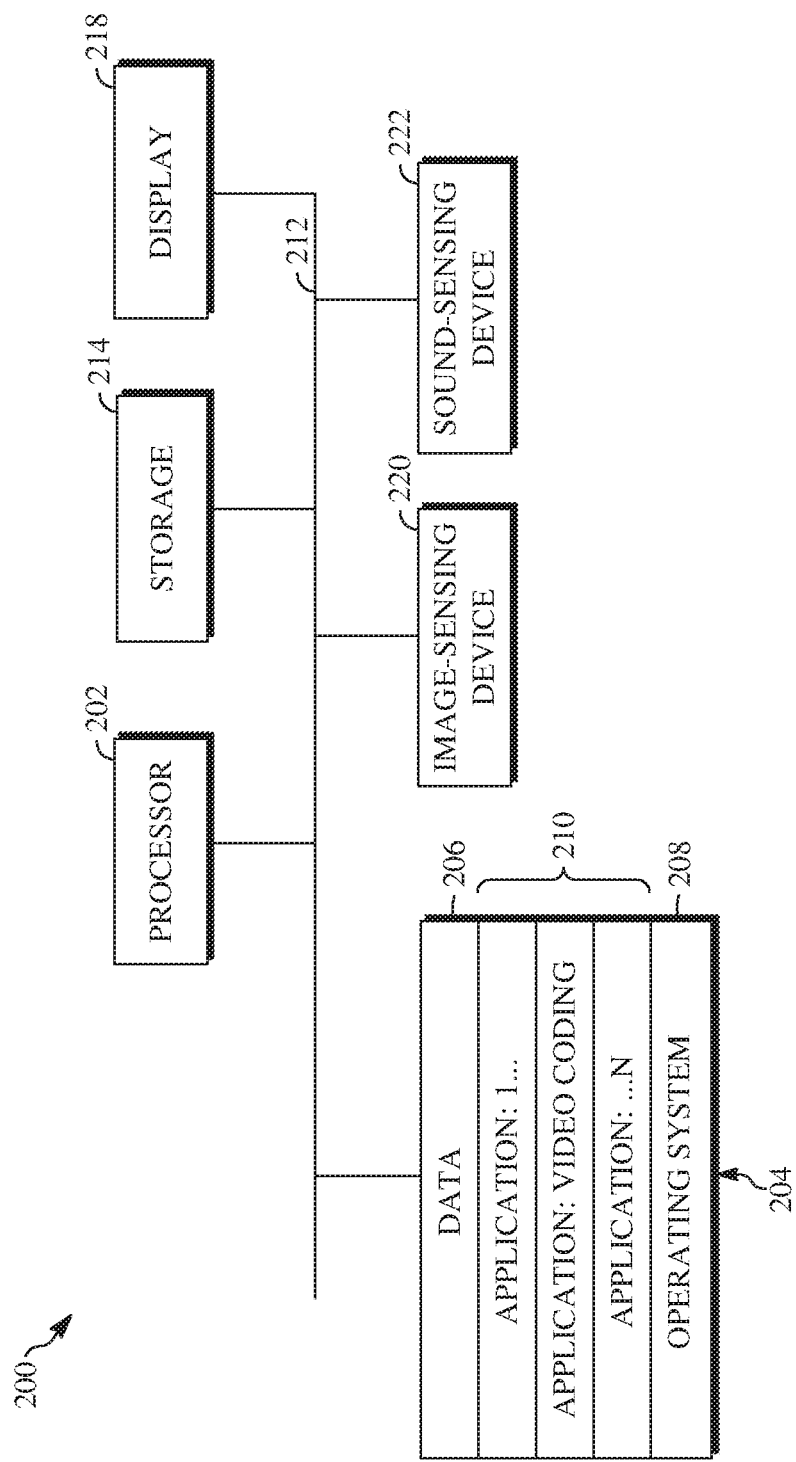
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., a Hypertext Transfer Protocol-based (HTTP-based) video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A CPU 202 in the computing device 200 can be a conventional central processing unit. Alternatively, the CPU 202 can be any other type of device, or multiple devices, capable of manipulating or processing information now-existing or hereafter developed. Although the disclosed implementations can be practiced with one processor as shown, e.g., the CPU 202, advantages in speed and efficiency can be achieved using more than one processor.

A memory 204 in computing device 200 can be a read only memory (ROM) device or a random access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here. Computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into one unit, other configurations can be utilized. The operations of the CPU 202 can be distributed across multiple machines (wherein individual machines can have one or more of processors) that can be coupled directly or across a local area or other network. The memory 204 can be distributed across multiple machines such as a network-based memory or memory in multiple machines performing the operations of the computing device 200. Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
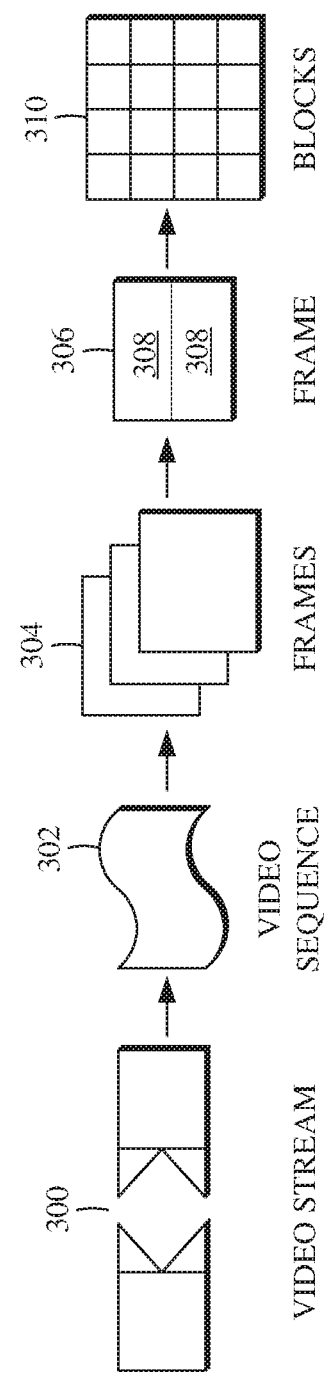
FIG. 3 is a diagram of a typical video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 4:
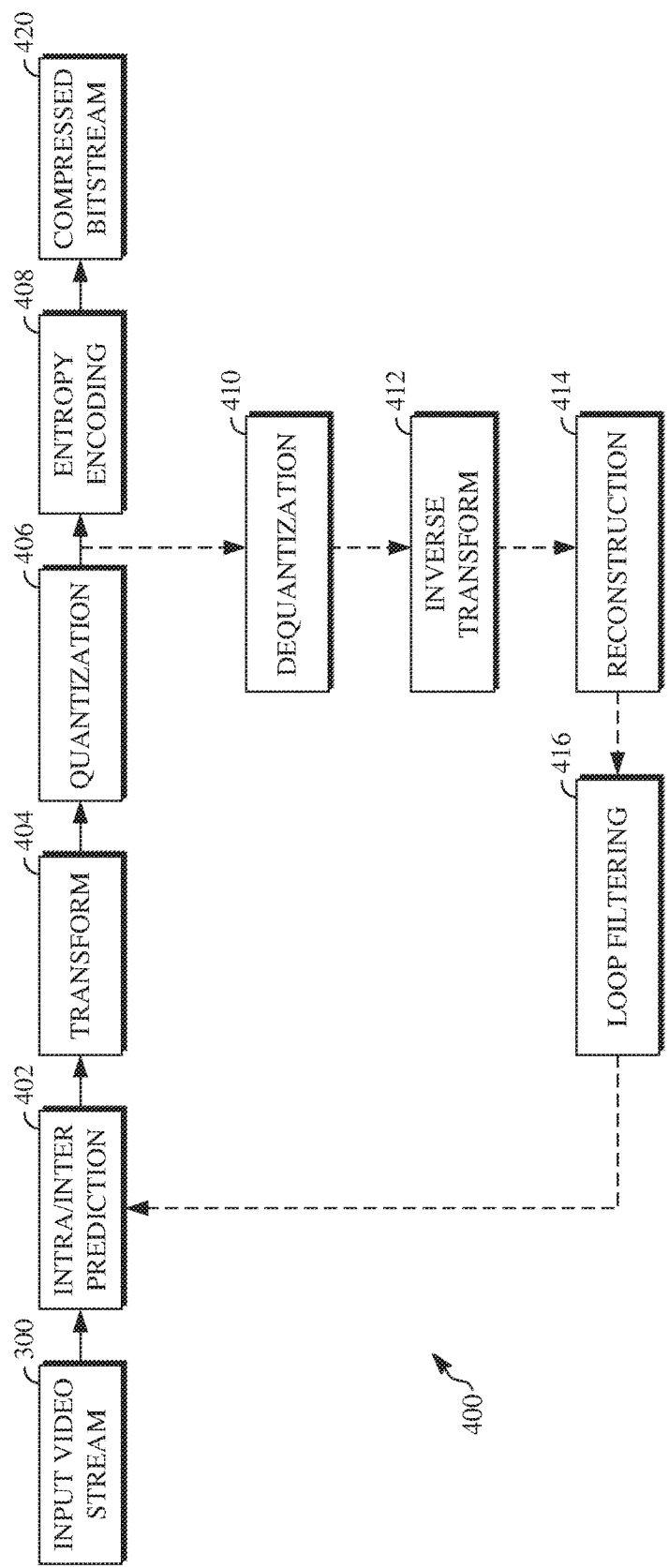
FIG. 4 is a block diagram of an encoder according to implementations of this disclosure.

FIG. 4 is a block diagram of an encoder 400 according to implementations of this disclosure. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in the manner described in FIG. 4. The encoder 400 can also be implemented as specialized hardware included in, for example, the transmitting station 102. In one particularly desirable implementation, the encoder 400 is a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, respective frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames. Implementations for forming a prediction block are discussed below with respect to FIGS. 6, 7, and 8, for example, using warped motion compensation to project pixels of a current block to a warped patch of a reference frame.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. The entropy-encoded coefficients, together with other information used to decode the block, which may include for example the type of prediction used, transform type, motion vectors and quantizer value, are then output to the compressed bitstream 420. The compressed bitstream 420 can be formatted using various techniques, such as variable length coding (VLC) or arithmetic coding. The compressed bitstream 420 can also be referred to as an encoded video stream or encoded video bitstream, and the terms will be used interchangeably herein.

The reconstruction path in FIG. 4 (shown by the dotted connection lines) can be used to ensure that the encoder 400 and a decoder 500 (described below) use the same reference frames to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform based encoder can quantize the residual signal directly without the transform stage 404 for certain blocks or frames. In another implementation, an encoder can have the quantization stage 406 and the dequantization stage 410 combined in a common stage.

Figure 5:
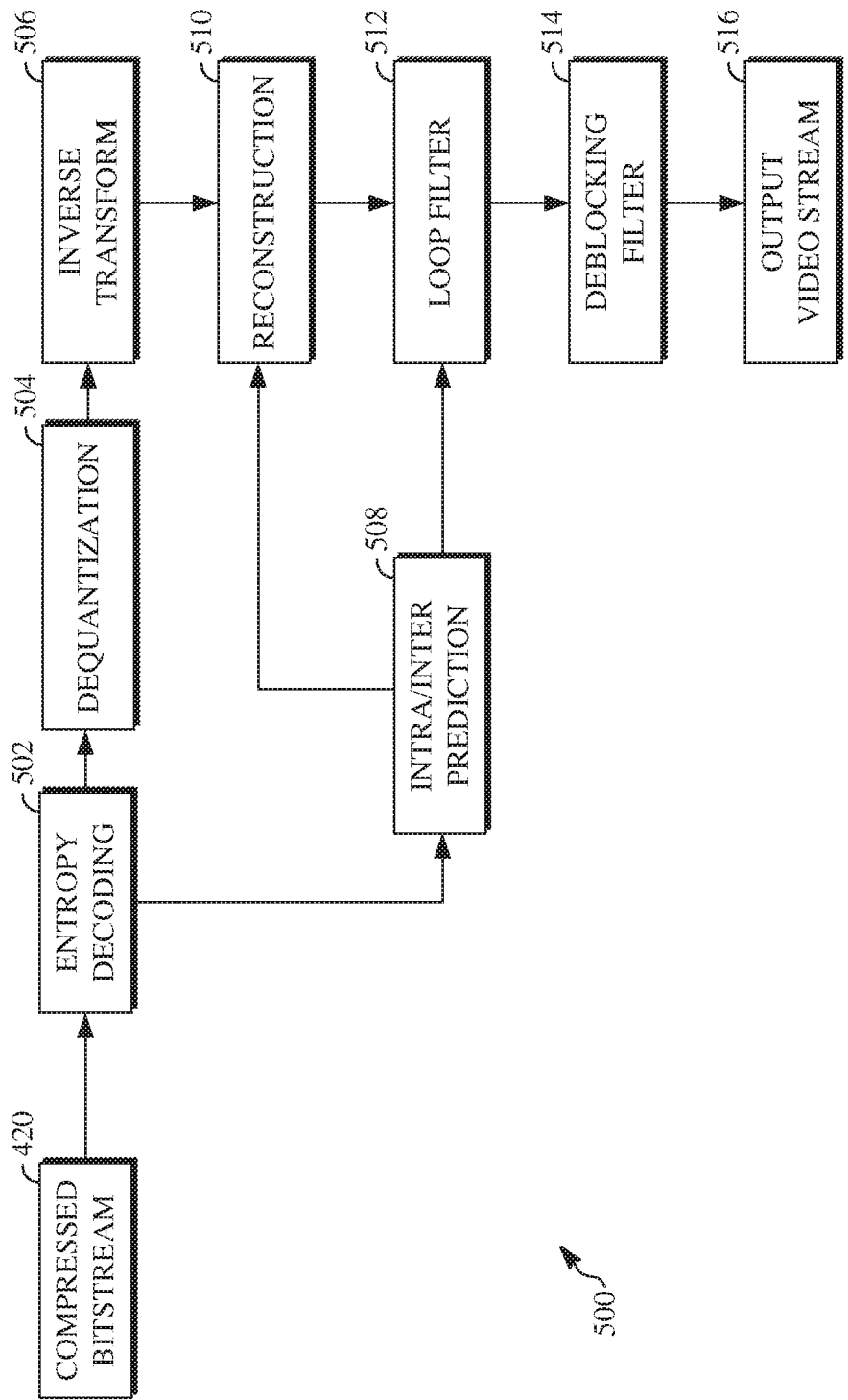
FIG. 5 is a block diagram of a decoder according to implementations of this disclosure.

FIG. 5 is a block diagram of a decoder 500 according to implementations of this disclosure. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manner described in FIG. 5. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512 and a deblocking filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400, e.g., at the intra/inter prediction stage 402. Implementations for forming a same prediction block as was created in the encoded 400 are discussed below with respect to FIGS. 6, 7, and 8, for example, using warped motion compensation to project pixels of a current block to a warped patch of a reference frame. At the reconstruction stage 510, the prediction block can be added to the derivative residual to create a reconstructed block. The loop filtering stage 512 can be applied to the reconstructed block to reduce blocking artifacts.

Other filtering can be applied to the reconstructed block. In this example, the deblocking filtering stage 514 is applied to the reconstructed block to reduce blocking distortion, and the result is output as the output video stream 516. The output video stream 516 can also be referred to as a decoded video stream, and the terms will be used interchangeably herein. Other variations of the decoder 500 can be used to decode the compressed bitstream 420. For example, the decoder 500 can produce the output video stream 516 without the deblocking filtering stage 514.

Figure 6:
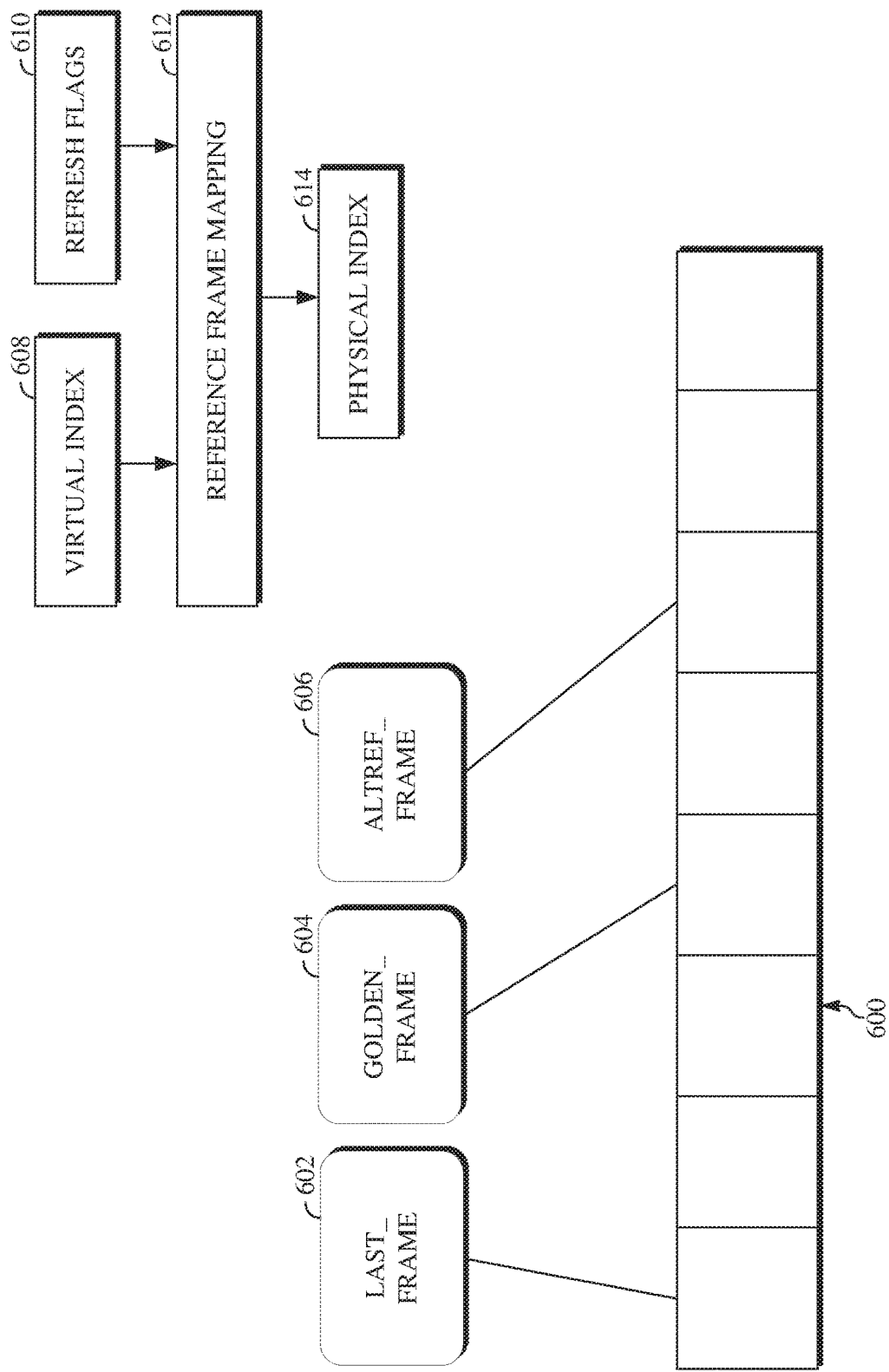
FIG. 6 is a block diagram of an example of a reference frame buffer.

FIG. 6 is a block diagram of an example of a reference frame buffer 600. The reference frame buffer 600 stores reference frames used to encode or decode blocks of frames of a video sequence. The reference frame buffer 600 includes a last frame LAST_FRAME 602, a golden frame GOLDEN_FRAME 604, and an alternative reference frame ALTREF_FRAME 606. The frame header of a reference frame includes a virtual index 608 to a location within the reference frame buffer 600 at which the reference frame is stored. A reference frame mapping 604 maps the virtual index 602 of a reference frame to a physical index 606 of memory at which the reference frame is stored. Where two reference frames are the same frame, those reference frames will have the same physical index even if they have different virtual indexes. One or more refresh flags 608 can be used to remove one or more of the stored reference frames from the reference frame buffer 600, for example, to clear space in the reference frame buffer 600 for new reference frames, where there are no further blocks to encode or decode using the stored reference frames, or where a new golden frame is encoded or decoded.

The reference frames stored in the reference frame buffer 600 can be used to identify motion vectors for predicting blocks of frames to be encoded or decoded. Different reference frames may be used depending on the type of prediction used to predict a current block of a current frame. For example, in bi-prediction, blocks of the current frame can be forward predicted using either the LAST_FRAME 602 or the GOLDEN_FRAME 604, or those frames can be backward predicted using the ALTREF_FRAME 606.

There may be a finite number of reference frames that can be stored within the reference frame buffer 600. As shown in FIG. 6, the reference frame buffer 600 can store up to eight reference frames, wherein each stored reference frame may be associated with a different virtual index 602 of the reference frame buffer. Although three of the eight spaces in the reference frame buffer 600 are used by the LAST_FRAME 602, the GOLDEN_FRAME 604, and the ALTREF_FRAME 606, five spaces remain available to store other reference frames.

In particular, one or more available spaces in the reference frame buffer 600 may be used to store additional alternative reference frames (e.g., ALTREF1_FRAME, ALTREF2_FRAME, etc., wherein the original alternative reference frame ALTREF_FRAME 606 could be referred to as ALTREF0_FRAME). The ALTREF_FRAME 606 is a frame of a video sequence that is distant from a current frame in a display order, but is encoded or decoded earlier than it is displayed. For example, the ALTREF_FRAME 606 may be ten, twelve, or more (or fewer) frames after the current frame in a display order.

However, the additional alternative reference frames can be frames located nearer to the current frame in the display order. For example, a first additional alternative reference frame, ALTREF2_FRAME, can be five or six frames after the current frame in the display order, whereas a second additional alternative reference frame, ALTREF3_FRAME, can be three or four frames after the current frame in the display order. Being closer to the current frame in display order increases the likelihood of the features of a reference frame being more similar to those of the current frame. As such, one of the additional alternative reference frames can be stored in the reference frame buffer 600 as additional options usable for backward prediction.

Although the reference frame buffer 600 is shown as being able to store up to eight reference frames, other implementations of the reference frame buffer 600 may be able to store additional or fewer reference frames. Furthermore, the available spaces in the reference frame buffer 600 may be used to store frames other than additional alternative reference frames. For example, the available spaces may store a second last frame LAST2_FRAME and/or a third last frame LAST3_FRAME as additional forward prediction reference frames. In another example, a backward frame BWDREF_FRAME may be stored as an additional backward prediction reference frame.

FIG. 7A is a diagram showing examples of layers of frames of a video sequence according to a display order of the video sequence. The display order of the frames shown in FIG. 7A includes reference frames (e.g., the frames 700, 702, 704, 706, 712, and 714) and non-reference frames (e.g., the frames 708, 710, 716, and 718). Although FIG. 7A shows ten frames, other implementations of display orders of frames of a video sequence may include additional or fewer frames.

The frames shown in FIG. 7A represent a subset of frames of a video sequence wherein a first frame of the display order corresponds to a key frame or previous overlay frame (e.g., the GOLDEN_FRAME frame 700) and a last frame thereof corresponds to an alternative reference frame (e.g., the ALTREF0_FRAME 702). The ALTREF0_FRAME 702 is far enough away from the GOLDEN_FRAME frame 700 in display order to have different features but not so different that the two cannot both be used as reference frames for another frame of the video sequence. For example, the ALTREF0_FRAME 702 may be a frame that is ten to twelve frames away from the GOLDEN_FRAME 700. In another example, the ALTREF0_FRAME 702 may be a frame that is twelve to fifteen frames away from the GOLDEN_FRAME 700.

Selecting a frame more than fifteen frames from the GOLDEN_FRAME 700 increases the difficulty in identifying similarities between features between those frames (unless the video sequence has very static motion, which is not always the case). However, because the ALTREF0_FRAME frame 702 is a backwards prediction frame, selecting a frame that is closer than ten frames from the GOLDEN_FRAME frame 700 as the ALTREF0_FRAME frame 702 limits the number of frames for which the ALTREF0_FRAME frame 702 can be a reference frame.

The frames of a video sequence to be encoded or decoded can be organized into layers in a display order based on the differences in the features of those frames (e.g., such as determined during a first-pass of an encoder, as described later). As such, there will be a greater number of layers when there are greater differences between the features of the frames to display. The display order of frames shown in FIG. 7A includes four layers. A first layer includes the GOLDEN_FRAME frame 700 and the first ALTREF0_FRAME frame 702. A second layer includes a second ALTREF1_FRAME frame 712 and a third ALTREF2_FRAME frame 704. A third layer includes two more reference frames 706 and 714. The frames 706 and 714 may both be BWDREF_FRAMEs, one may be a BWDREF_FRAME and another a fourth ALTREF3_FRAME, or another configuration. A fourth layer includes non-reference frames 708, 710, 716, and 718. In some implementations, one or more frames in the third layer may be non-reference frames.

The second ALTREF1_FRAME frame 712 and the third ALTREF2_FRAME frame 704 can be selected as frames evenly (or approximately evenly) spaced apart between the GOLDEN_FRAME frame 700 and the first ALTREF0_FRAME frame 702. For example, where the GOLDEN_FRAME frame 700 and the first ALTREF0_FRAME frame 702 are twelve frames apart, the second ALTREF1_FRAME frame 712 can be four frames away from the first ALTREF0_FRAME frame 702 and the third ALTREF2_FRAME frame 704 can be eight frames away from the first ALTREF0_FRAME frame 702. A fourth ALTREF3_FRAME (e.g., the frame 714) may thus be six frames from the first ALTREF0_FRAME frame 702.

Temporal filtering is applied to the alternative reference frames to reduce the differences (e.g., in video features) between those frames and a current frame to be encoded or decoded. Varying strengths of temporal filtering are applied to the alternative reference frames based on the layer in which they are located. For example, the alternative reference frames of lower layers (e.g., the first layer) will have stronger temporal filtering applied than those of the higher layers (e.g., the second or third layer). This is because the alternative reference frames of the lower layers are farther from the current frame in display order and are therefore more likely to include a greater number of differences compared to the current frame.

Temporal filtering may use characteristics (e.g., video features) of neighbor frames of the subject frame to filter the subject frame. As such, when temporal filtering is applied to a subject frame, the frame is filtered according to its own video features and those of its neighbors. The resulting temporally-filtered frame thus represents the video features of multiple, successive frames of a video sequence, especially when a stronger temporal filter is applied. Accordingly, frames that are temporally filtered serve as efficient reference frames for encoding or decoding other frames of the video sequence. However, a single temporally-filtered frame may not be optimal (e.g., from a signal-to-noise or other rate-distortion perspective) where it is too distant from a current frame. The likelihood of selecting a reference frame that results in an optimal signal-to-noise ratio increases by applying different strengths of temporal filtering to a plurality of frames located at different distances from a current frame.

FIG. 7B is a diagram showing an example encoding or decoding order of the frames shown in FIG. 7A according to the layers of FIG. 7A. The GOLDEN_FRAME frame 700 is the first frame encoded or decoded, followed by the first ALTREF0_FRAME frame 702 and then another ALTREF2_FRAME 704. The encoding or decoding order of the frames follows the hierarchy of layers shown in FIG. 7A. For example, the first two frames 700, 702 correspond to the first layer of the display order. The third frame 704 corresponds to a second layer of the display order. The fourth frame 706 corresponds to a third layer of the display order. The fifth and sixth frames 708, 710 correspond to a fourth layer of the display order.

The encoding or decoding order of the frames shown in FIG. 7B also includes show/overlay frames 720, 722 not present in the display order of the frames shown in FIG. 7A. Although two show/overlay frames 720, 722 are shown in FIG. 7B, other implementations of encoding or decoding orders of frames of a video sequence may include additional or fewer show/overlay frames.

A show/overlay frame 720, 722 is inserted into the encoding or decoding order at a position relative to a position at which an alternative reference frame is in the display order. For example, the show/overlay frame 720, which is located approximately in the middle of the encoding or decoding order of the frames shown in FIG. 7B, can correspond to the ALTREF2_FRAME frame 704, which is located approximately in the middle of the display order of the frames shown in FIG. 7A. Similarly, the show/overlay frame 722, which is located at the end of the encoding or decoding order shown in FIG. 7B can correspond to one of the ALTREF0_FRAME frame 702 or the ALTREF1_FRAME frame 712, which are located at the end of the display order shown in FIG. 7A.

A show/overlay frame 720, 722 is one of an existing frame or an overlay frame based on whether temporal filtering is applied to the corresponding alternative reference frame. The show/overlay frame 720, 722 is an existing frame if no temporal filtering is applied. For example, where the alternative reference frame corresponding to the show/overlay frame 720, 722 is too close in display order to a current frame being encoded or decoded (e.g., four or fewer frames of the current frame), a show existing frame flag can be set to one. That is, it may be preferable to use the original form of a reference frame that is so close to a current frame so that the reference frame can provide better temporal directional prediction for the encoding or decoding. As such, when the show existing frame flag is set to one, the alternative reference frame is displayed in an output bitstream in its original form (e.g., without temporal filtering applied).

Contrastingly, the show/overlay frame 720, 722 is an overlay frame where temporal filtering is applied to the corresponding alternative reference frame. An overlay frame is used to encode or decode a difference between an original form of the corresponding alternative reference frame and the form thereof after temporal filtering is applied to that frame. Applying temporal filtering to an alternative reference frame can cause the show existing frame flag for that frame to be set to zero so as to indicate that an overlay frame will be used in the output bitstream.

Figure 8:
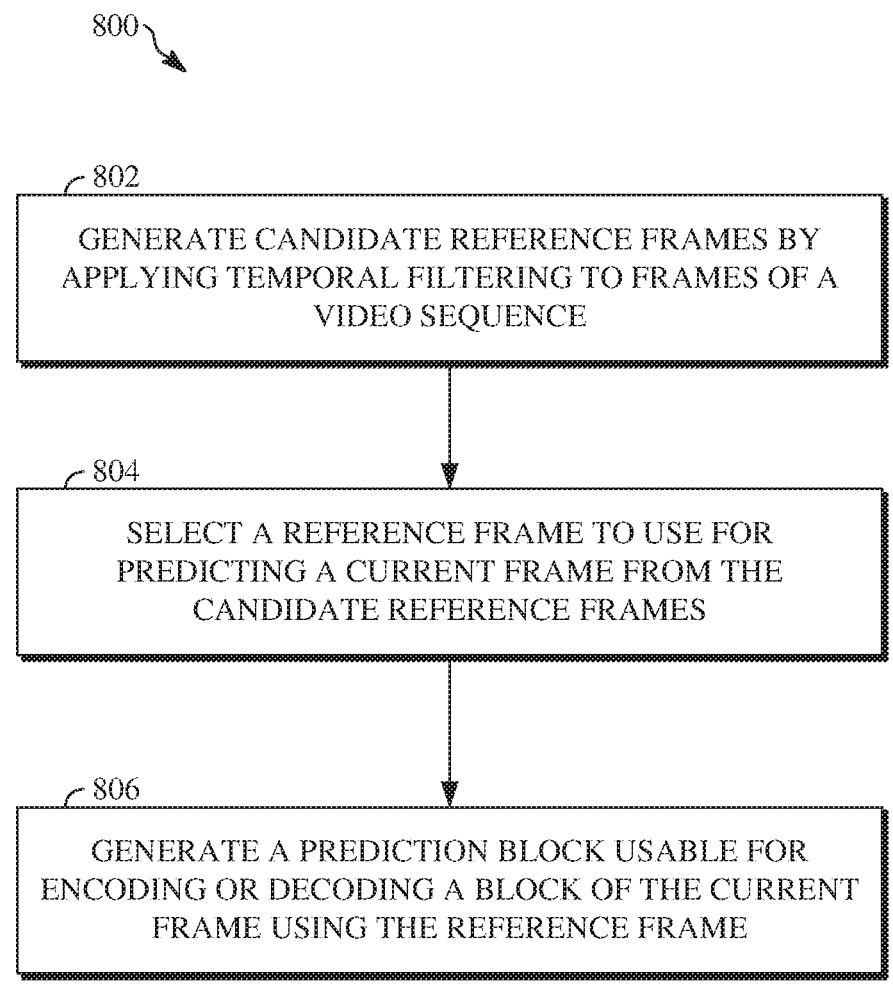
FIG. 8 is a flowchart diagram of a process for encoding or decoding blocks of a current frame using reference frames with adaptive temporal filtering.

FIG. 8 is a flowchart diagram of a process 800 for encoding or decoding blocks of a current frame using reference frames with adaptive temporal filtering. The process 800 can be implemented, for example, as a software program that may be executed by computing devices such as transmitting station 102 or receiving station 106. For example, the software program can include machine-readable instructions that may be stored in a memory such as the memory 204 or the secondary storage 214, and that, when executed by a processor, such as CPU 202, may cause the computing device to perform the process 800. The process 800 can be implemented using specialized hardware or firmware. As explained above, some computing devices may have multiple memories or processors, and the operations described in the process 800 can be distributed using multiple processors, memories, or both.

At 802, candidate reference frames usable for predicting the motion of a block of a current frame are generated by applying temporal filtering to one or more frames of the video sequence according to relationships between respective ones of the one or more frames and a current frame of the video sequence. Generating the candidate reference frames may comprise determining a distance in display order between the current frame and one of the other frames of the video sequence and generating a candidate reference frame corresponding to that other frame responsive to determining that the distance exceeds a threshold.

Determining the distance in display order can comprise identifying positions in display order of respective frames and calculating a difference between those positions, receiving data indicative of the positions in display order or a calculated difference (e.g., from a processor of the computing device on which the temporal filtering is applied or from a secondary computing device, which may be a transmitting station or a receiving station), requesting the position or difference information from a database or other data store, another technique, or a combination thereof. Generating the candidate reference frame can comprise generating new frame data based on a source frame (e.g., the frame before temporal filtering is applied) and the applied temporal filter, selecting data indicative of the source frame and applying the temporal filter thereto, receiving data indicative of the source frame and/or temporal filter before or after the temporal filter is applied to the source frame, another technique, or a combination thereof.

The strength of the temporal filtering to be applied is determined based on a distance between the current frame to be encoded or decoded and the alternative reference frame selected as the reference frame for predicting the current frame. The temporal filtering applied to a frame to generate a candidate reference frame is stronger when the distance in the display order between the current frame and the frame is greater. This is because there is a higher probability of the features of those frames being different.

A two-pass encoder may be used to encode the current frame and pass along reference frame information to a decoder. Video features, such as motion information, of the frames of a video sequence are collected during a first-pass, such as by encoding the frames using a last frame (e.g., the LAST_FRAME 602). The motion information collected during the first-pass is statistically analyzed to determine compact, smooth, and other features of the frames of the video sequence. The temporal filtering strength to be applied to frames during a second-pass of the encoder is determined using those determined features. For example, a weaker temporal filter can be applied where the motion along successive frames of the video sequence is smooth. As such, the first-pass can comprise performing a pre-processing analysis against the frames of the video sequence to identify motion features of the frames, and the second-pass can comprise determining a temporal filtering strength to use for applying the temporal filtering to the frames based on the motion features.

Determining the temporal filtering strength to apply to the frames during the second-pass can include determining a number of layers to which the alternative reference frames to be temporally filtered correspond. For example, a first alternative reference frame can be selected as a frame that shares some similarities with a golden frame identified during the first-pass. The first alternative reference frame can be located at a first layer along with the golden frame. Based on the number of frames in between the golden frame and the first alternative reference frame in display order, one or two alternative reference frames can be located at a second layer. The one or two alternative reference frames can be equally (or approximately equally) spaced apart between the golden frame and the first alternative reference frame. If there are more than a threshold number of frames (e.g., twelve) between the golden frame and the first alternative reference frame in display order, there may be two alternative reference frames in the second layer and one more alternative reference frame located at a third layer.

There may not be an alternative reference frame located at a fourth layer. For example, it may not be desirable to select a frame farther than a threshold number of frames (e.g., fifteen) away from a golden frame as a first alternative reference frame because anything farther may not have enough video feature similarity to a current frame. However, it also may not be desirable to have a reference frame that is closer than a threshold number of frames (e.g., four) to a current frame. For example, the video features of such a reference frame would be so similar to those of the current frame that it would be more effective to simply predict the blocks of the current frame using intra-prediction. Since the alternative reference frames of the first, second, and third layers are equally (or approximately equally) spaced apart, an alternative reference frame at a fourth layer would likely be less than the threshold. As such, the candidate reference frames generated at 802 are associated with one of a first layer of reference frames, a second layer of reference frames, or a third layer of reference frames based on a distance between respective ones of the candidate reference frames and a current frame to be encoded or decoded.

The current frame to be encoded or decoded will thus be at one of the third layer, the fourth layer, or a higher layer, to the extent available. As such, the alternative reference frame at the first layer may have a strongest temporal filter applied. An alternative reference frame of the third layer may have a weakest temporal filter applied. The one or two alternative reference frames at the second layer may have a temporal filter stronger than that of the third layer and weaker than that of the first layer applied.

At 804, one of the candidate reference frames generated at 802 is selected as a reference frame to use for predicting the current frame from the one or more candidate reference frames. Selecting the reference frame can comprise generating one or more candidate prediction blocks corresponding to the one or more candidate reference frames (e.g., generated at 802) and selecting, as the reference frame, the candidate reference frame corresponding to a candidate prediction block having a lowest signal-to-noise ratio. Generating the candidate prediction blocks can comprise generating new data indicative of the candidate prediction blocks, receiving data indicative of the candidate prediction blocks, identifying blocks within the candidate reference frames to use as the candidate prediction blocks (e.g., using a defined process or instructions received from a processor on which the candidate reference frames were generated at 802 or a secondary computing device which may be a transmitting station or receiving station), another technique, or a combination thereof. At 806, a prediction block usable to encode or decode a block of the current frame is generated using the reference frame selected at 804.

For simplicity of explanation, the process 800 is depicted and described as a series of steps or operations. However, the steps or operations in accordance with this disclosure can occur in various orders and/or concurrently. Additionally, other steps or operations not presented and described herein may be used. Furthermore, not all illustrated steps or operations may be required to implement a method in accordance with the disclosed subject matter.

For example, the process 800 may additionally include an operation for, responsive to determining that a strength of temporal filtering applied to a candidate reference frame is zero, including the reference frame in a decoded video sequence. In another example, the process 800 may additionally include an operation for, responsive to determining that the strength of temporal filtering applied to the candidate reference frame is greater than zero, generating a display frame (e.g., an overlay frame) based on a difference between the candidate reference frame and a non-temporally filtered version of the candidate reference frame and including the display frame in the decoded video sequence.

In yet another example, the process 800 additionally includes one or more operations for encoding or decoding the current block using a prediction block. In some implementations, encoding the current block using the prediction block includes transforming the values for the pixels of the prediction block, quantizing the transformed pixel values, entropy encoding the quantized pixel values, and encoding the entropy encoded pixel values to generate an encoded bitstream. Decoding the current block using the prediction block can include entropy decoding pixel values for the encoded current block received from an encoded bitstream, dequantizing the entropy decoded pixel values, inverse transforming the dequantized pixel values, and reconstructing the current block using the prediction block.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general purpose computer or general purpose processor with a computer program that, when executed, carries out any of the respective methods, algorithms and/or instructions described herein. In addition, or alternatively, for example, a special purpose computer/processor can be utilized which can contain other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server and the receiving station 106 can be implemented on a device separate from the server, such as a hand-held communications device. In this instance, the transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device and/or a device including an encoder 400 may also include a decoder 500.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for encoding a block of a current frame of a video sequence, the method comprising:
    providing a reference frame buffer storing reference frames available for predicting motion within the block, the reference frames including a first alternative reference frame, a second alternative reference frame, and one or more other reference frames, the one or more other reference frames including a golden frame, wherein the reference frames stored in the reference frame buffer are organized into layers based on differences in features of frames of the video sequence, wherein the first alternative reference frame and the golden frame are in a first layer of the layers, wherein the second alternative reference frame is in a second layer of the layers, wherein the current frame is in a layer of the layers other than the first layer or the second layer;
    applying temporal filtering to each of the first and second alternative reference frames available for predicting motion within the current frame, wherein the first alternative reference frame is a first number of frames after the current frame in a display order of the video sequence and the second alternative reference frame is a second number of frames after the current frame in the display order, wherein the first number of frames meets a first threshold representing a maximum distance from the current frame and the second number of frames meets a second threshold representing a minimum distance from the current frame;
    subsequent to applying the temporal filtering, identifying first and second candidate reference frame pairs, wherein the first candidate reference frame pair includes the first alternative reference frame and a first one of the one or more other reference frames, wherein the second candidate reference frame pair includes the second alternative reference frame and a second one of the one or more other reference frames, wherein the first one of the one or more other reference frames is a third number of frames before the current frame in the display order and the second one of the one or more other reference frames is a fourth number of frames before the current frame in the display order;
    selecting, as a reference frame pair to use for bi-directionally predicting the motion within the block, one of the first candidate reference frame pair or the second candidate reference frame pair;
    generating a prediction block using the reference frame pair; and
    encoding the block using the prediction block.

2. The method of claim 1, wherein applying the temporal filtering to each of the first and second alternative reference frames available for predicting the motion within the current frame comprises:
    applying the temporal filtering to the first alternative reference frame based on the first number of frames; and
    applying the temporal filtering to the second alternative reference frame based on the second number of frames.

3. The method of claim 1, wherein applying the temporal filtering to each of the first and second alternative reference frames available for predicting the motion within the current frame comprises:
    applying the temporal filtering to the first alternative reference frame and to the second alternative reference frame based on motion features identified within successive frames of the display order.

4. The method of claim 1, wherein identifying the first and second candidate reference frame pairs available for bi-directionally predicting the motion within the block comprises:
    determining that each of the first number of frames and the second number of frames exceeds a threshold.

5. The method of claim 1, wherein selecting the one of the first candidate reference frame pair or the second candidate reference frame pair comprises:
    determining signal-to-noise ratios resulting from encoding the block using each of the first candidate reference frame pair and the second candidate reference frame pair; and
    selecting the reference frame pair based on a lowest one of the signal-to-noise ratios.

6. The method of claim 1, wherein the second number of frames is less than the first number of frames.

7. A method for decoding an encoded block of a current encoded frame from a bitstream, the method comprising:
    providing a reference frame buffer storing reference frames available for predicting motion within the encoded block, the reference frames including a first alternative reference frame, a second alternative reference frame, and one or more other reference frames, the one or more other reference frames including a golden frame, wherein the reference frames stored in the reference frame buffer are organized into layers based on differences in features of frames of a video sequence represented by the bitstream, wherein the first alternative reference frame and the golden frame are in a first layer of the layers, wherein the second alternative reference frame is in a second layer of the layers, wherein the current frame is in a layer of the layers other than the first layer or the second layer;
    applying temporal filtering to each of the first and second alternative reference frames, wherein the first alternative reference frame is a first number of frames after the current encoded frame in a display order of a video sequence represented by the bitstream and the second alternative reference frame is a second number of frames after the current encoded frame in the display order, wherein the first number of frames meets a first threshold representing a maximum distance from the current frame and the second number of frames meets a second threshold representing a minimum distance from the current frame;
- identifying first and second candidate reference frame pairs, wherein the first candidate reference frame pair includes the first alternative reference frame and a first one of the one or more other reference frames, wherein the second candidate reference frame pair includes the second alternative reference frame and a second one of the one or more other reference frames, wherein the first one of the one or more other reference frames is a third number of frames before the current frame in the display order and the second one of the one or more other reference frames is a fourth number of frames before the current frame in the display order;
- selecting, as a reference frame pair, one of the first candidate reference frame pair or the second candidate reference frame pair;
- generating a prediction block for the encoded block by bi-directionally predicting motion within the encoded block using the reference frame pair;
- reconstructing a prediction residual associated with the encoded block into a decoded block using the prediction block; and
- outputting the decoded block to an output video stream.

8. The method of claim 7, wherein applying the temporal filtering to each of the first and second alternative reference frames available for predicting the motion within the current encoded frame comprises:
- applying the temporal filtering to the first alternative reference frame based on the first number of frames; and
- applying the temporal filtering to the second alternative reference frame based on the second number of frames.

9. The method of claim 7, wherein applying the temporal filtering to each of the first and second alternative reference frames available for predicting the motion within the current encoded frame comprises:
- applying the temporal filtering to the first alternative reference frame and to the second alternative reference frame based on motion features identified within successive frames of the display order.

10. The method of claim 7, wherein identifying the first and second candidate reference frame pairs available for bi-directionally predicting the motion within the encoded block comprises:
- determining that each of the first number of frames and the second number of frames exceeds a threshold.

11. The method of claim 7, wherein selecting the one of the first candidate reference frame pair or the second candidate reference frame pair comprises:
- determining signal-to-noise ratios resulting from decoding the encoded block using each of the first candidate reference frame pair and the second candidate reference frame pair; and
- selecting the reference frame pair based on a lowest one of the signal-to-noise ratios.

12. The method of claim 7, further comprising:
- generating a display frame based on a difference between the first alternative reference frame and a non-temporally filtered version of the first alternative reference frame; and
- outputting the display frame to the output video stream.

13. The method of claim 7, wherein the second number of frames is less than the first number of frames.

14. An apparatus for decoding an encoded block of a current encoded frame from a bitstream, the apparatus comprising:
- a processor configured to execute instructions stored in a non-transitory storage medium to:
  - provide a reference frame buffer storing reference frames available for predicting motion within the encoded block, the reference frames including a first alternative reference frame, a second alternative reference frame, and one or more other reference frames, the one or more other reference frames including a golden frame, wherein the reference frames stored in the reference frame buffer are organized into layers based on differences in features of frames of a video sequence represented by the bitstream, wherein the first alternative reference frame and the golden frame are in a first layer of the layers, wherein the second alternative reference frame is in a second layer of the layers, wherein the current frame is in a layer of the layers other than the first layer or the second layer;
  - apply temporal filtering to each of the first and second alternative reference frames, wherein the first alternative reference frame is a first number of frames after the current encoded frame in a display order of a video sequence represented by the bitstream and the second alternative reference frame is a second number of frames after the current encoded frame in the display order, wherein the first number of frames meets a first threshold representing a maximum distance from the current frame and the second number of frames meets a second threshold representing a minimum distance from the current frame;
  - identify first and second candidate reference frame pairs, wherein the first candidate reference frame pair includes the first alternative reference frame and a first one of the one or more other reference frames, wherein the second candidate reference frame pair includes the second alternative reference frame and a second one of the one or more other reference frames, wherein the first one of the one or more other reference frames is a third number of frames before the current frame in the display order and the second one of the one or more other reference frames is a fourth number of frames before the current frame in the display order;
  - select, as a reference frame pair, one of the first candidate reference frame pair or the second candidate reference frame pair;
  - generate a prediction block for the encoded block by bi-directionally predicting motion within the encoded block using the reference frame pair;
  - reconstruct a prediction residual associated with the encoded block into a decoded block using the prediction block; and
  - output the decoded block to an output video stream.

15. The apparatus of claim 14, wherein the instructions to apply the temporal filtering to each of the first and second alternative reference frames available for predicting the motion within the current encoded frame include instructions to:
- apply the temporal filtering to the first alternative reference frame based on the first number of frames; and
- apply the temporal filtering to the second alternative reference frame based on the second number of frames.

16. The apparatus of claim 14, wherein the instructions to apply the temporal filtering to each of the first and second alternative reference frames available for predicting the motion within the current encoded frame include instructions to:
- apply the temporal filtering to the first alternative reference frame and to the second alternative reference frame based on motion features identified within successive frames of the display order.

17. The apparatus of claim 14, wherein the instructions to identify the first and second candidate reference frame pairs available for bi-directionally predicting the motion within the encoded block include instructions to:
- determine that each of the first number of frames and the second number of frames exceeds a threshold.

18. The apparatus of claim 14, wherein the instructions to select the one of the first candidate reference frame pair or the second candidate reference frame pair include instructions to:
- determine signal-to-noise ratios resulting from decoding the encoded block using each of the first candidate reference frame pair and the second candidate reference frame pair; and
- select the reference frame pair based on a lowest one of the signal-to-noise ratios.

19. The apparatus of claim 14, wherein the instructions include instructions to:
- generate a display frame based on a difference between the first alternative reference frame and a non-temporally filtered version of the first alternative reference frame; and
- output the display frame to the output video stream.

20. The apparatus of claim 14, wherein the second number of frames is less than the first number of frames.

* * * * *